United States Patent
Merwin et al.

(10) Patent No.: US 11,473,678 B2
(45) Date of Patent: Oct. 18, 2022

(54) ELECTRIC PARK LOCK ACTUATOR LIMITED ROTARY DISCONNECT

(71) Applicant: Continental Powertrain USA, LLC, Auburn Hills, MI (US)

(72) Inventors: Jeffrey D Merwin, Lincolnshire, IL (US); Keith Joseph Rodrigues, Wheeling, IL (US); Edward Hribar, Palos Hills, IL (US)

(73) Assignee: VITESCO TECHNOLOGIES USA, LLC, Auburn Hills, MI (US)

( * ) Notice: Subject to any disclaimer, the term of this patent is extended or adjusted under 35 U.S.C. 154(b) by 261 days.

(21) Appl. No.: 16/439,256

(22) Filed: Jun. 12, 2019

(65) Prior Publication Data
US 2019/0383391 A1 Dec. 19, 2019

Related U.S. Application Data

(60) Provisional application No. 62/684,577, filed on Jun. 13, 2018.

(51) Int. Cl.
*F16H 63/34* (2006.01)
*B60T 1/00* (2006.01)

(52) U.S. Cl.
CPC ......... *F16H 63/3416* (2013.01); *B60T 1/005* (2013.01); *F16H 63/3466* (2013.01)

(58) Field of Classification Search
CPC ... F16H 63/3416; F16H 63/3466; B60T 1/005
See application file for complete search history.

(56) References Cited

U.S. PATENT DOCUMENTS

| 5,794,748 A | 8/1998 | Heuver et al. |
| 5,827,149 A | 10/1998 | Sponable |
| 7,014,017 B2 | 3/2006 | Hanna et al. |

(Continued)

FOREIGN PATENT DOCUMENTS

| CN | 106641243 A | 5/2017 |
| DE | 19822667 A1 | 12/1998 |

(Continued)

OTHER PUBLICATIONS

International Search Report and the Written Opinion of the International Searching Authority dated Sep. 4, 2019 for the counterpart PCT Application No. PCT/2019/036985.

*Primary Examiner* — Colby M Hansen

(57) ABSTRACT

An electronic parking pawl actuator which uses a smaller motor and higher gear ratio has the ability to configure a rooster comb to engage with various park detents, and reduces the mechanical and software design complexity. Furthermore, the electronic park actuator limits the amount of back drivable range (unable to perform an external park to neutral shift) for theft deterrence, and also allows operation (speed performance) and a lower motor peak current. The electronic parking pawl actuator includes an electric motor, a drive gear, the drive gear operable for being driven by the electric motor, and a drive mechanism, the drive mechanism is operable for being driven by the drive gear. The drive mechanism is engaged with an output shaft of a gear selector of a transmission, and the drive mechanism is rotatable relative to the drive gear, allowing the output shaft to be located in a desired position.

12 Claims, 11 Drawing Sheets

(56) References Cited

U.S. PATENT DOCUMENTS

| | | | |
|---|---|---|---|
| 8,881,883 B2 | 11/2014 | Barton et al. | |
| 9,132,811 B2 | 9/2015 | Dufford et al. | |
| 2011/0132048 A1* | 6/2011 | Okada | B60R 25/02 |
| | | | 70/182 |
| 2012/0137800 A1* | 6/2012 | Park | F16H 19/0622 |
| | | | 74/89.14 |
| 2018/0172155 A1* | 6/2018 | Spratte | F16H 63/3475 |
| 2019/0383374 A1* | 12/2019 | Pfeiffer | F16H 1/28 |
| 2020/0200270 A1* | 6/2020 | Lenke | F16H 57/023 |

FOREIGN PATENT DOCUMENTS

| | | |
|---|---|---|
| DE | 10212038 A1 | 10/2003 |
| EP | 2636928 A1 | 9/2013 |
| EP | 2824354 A1 | 1/2015 |

\* cited by examiner

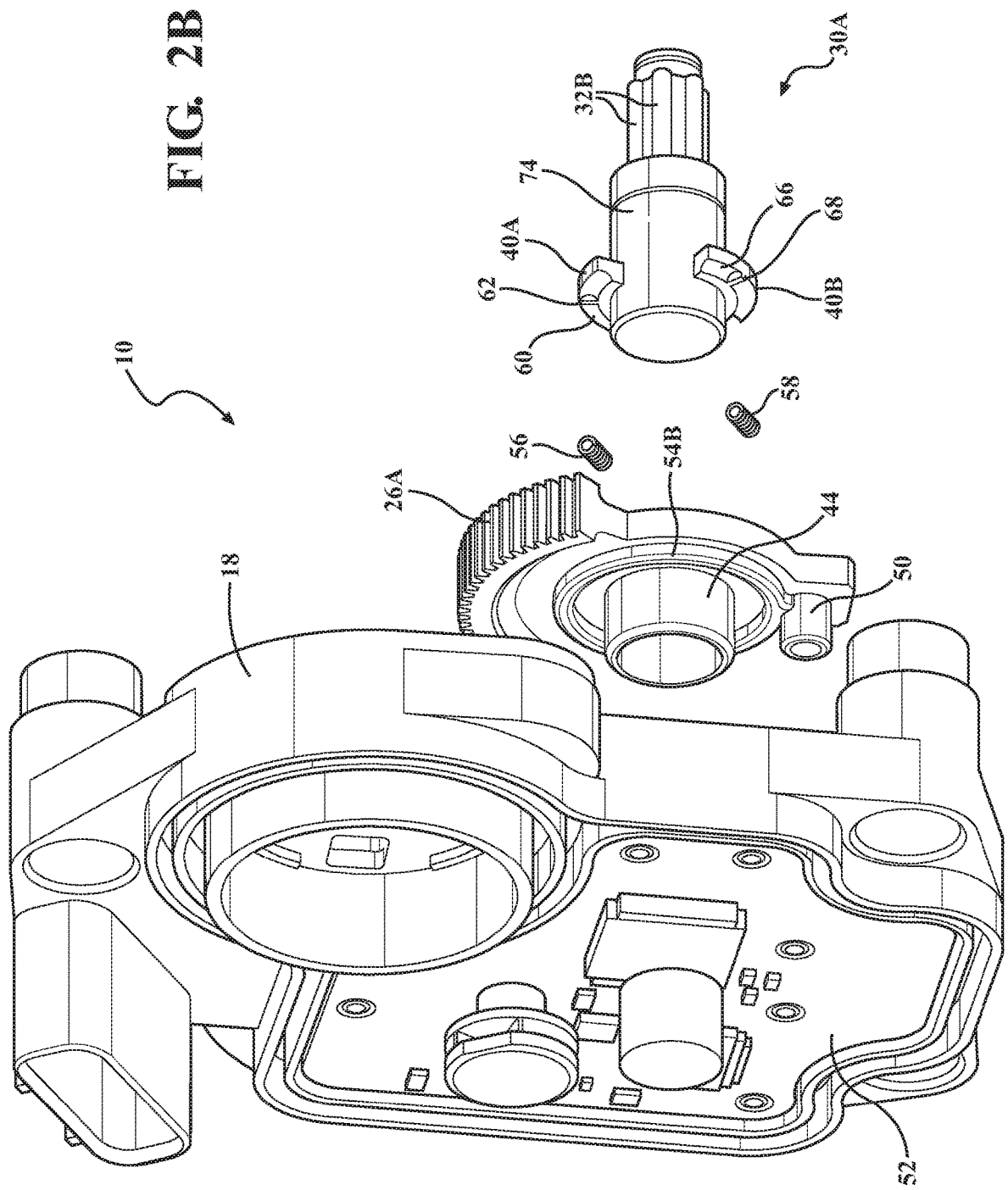

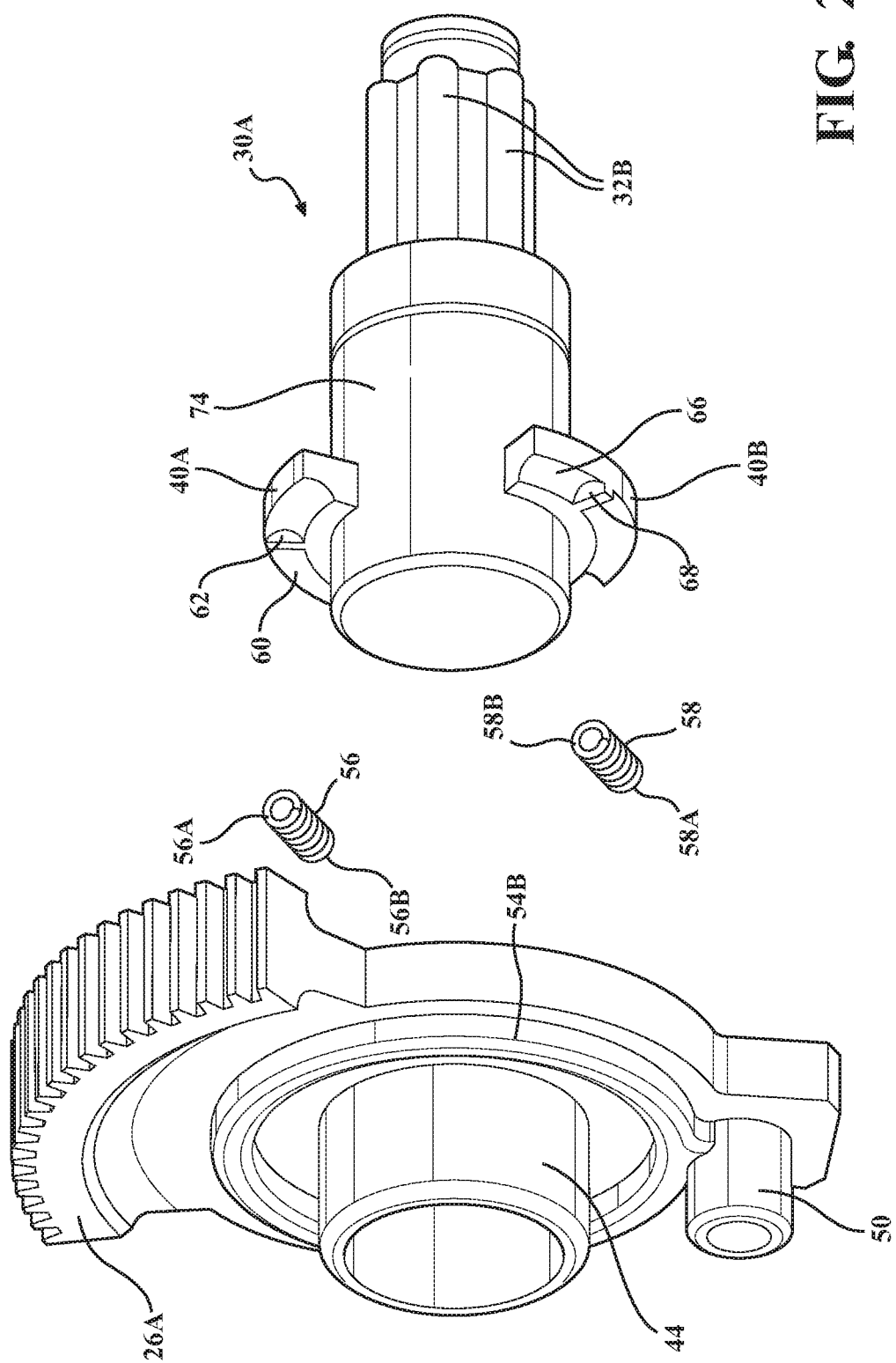

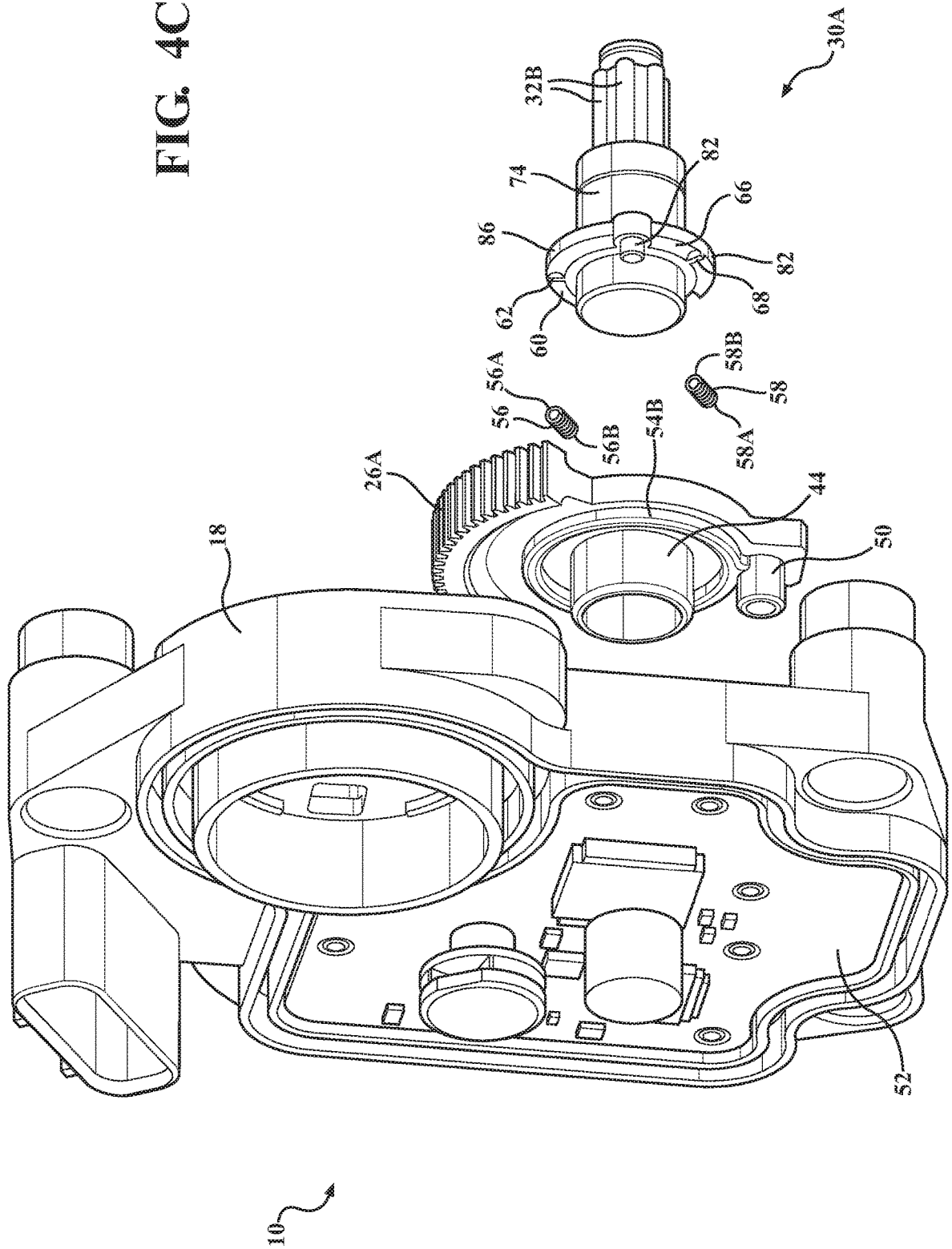

ELECTRIC PARK LOCK ACTUATOR LIMITED ROTARY DISCONNECT

CROSS-REFERENCE TO RELATED APPLICATIONS

This application claims the benefit of provisional application 62/684,577, filed Jun. 13, 2018. The disclosure of the above application is incorporated herein by reference.

FIELD OF THE INVENTION

The invention relates generally to an electronic parking pawl actuator which has the ability to configure a rooster comb to engage with various park detents using a smaller motor and higher gear ratio, and reduces the mechanical and software design complexity.

BACKGROUND OF THE INVENTION

Most transmissions in motor vehicles have a parking pawl to lock the transmission to prevent roll on a grade or when parked. This parking pawl meshes with teeth on a gear in the transmission, preventing rotation. The parking pawl is actuated by a spring-loaded actuator rod coupled through a so-called rooster comb. The rooster comb is a plate with multiple peaks and troughs, or detents. A spring-loaded follower falls into these detents to identify the gear position, including the park position. The actuator rod itself is driven electronically by a park-lock actuator or range selector.

The parking pawl is typically part of an actuation device which is used to configure a transmission to operate in a desired gear. The actuation device and parking pawl also perform various functions, such as drive line range select, park lock, and electronic transmission range selection. The devices used in these systems typically include an external position detent locator, which is driven by an electro-mechanical and/or electro-hydraulic actuator.

Most current typical designs for a park lock or park pawl actuator involve mechanical linkages and rely on manually shifting the gear selector to the desired position (PRNDL). Any electronic park lock actuator should be able to configure a transmission to operate in a desired gear and be functional for use with a rooster comb (or detent plate) while meeting stringent packaging requirements.

In addition, control of output position of the actuator is important to meet functionality. Several attempts to achieve an actuation device having an electrically driven function have been made by tightening accuracy of position movement. However, the changes to the mechanical design add additional cost beyond the current existing design. Current electronic actuator art requires actuation to a defined position requiring high position accuracy. With wear and tear, accuracy diminishes, which requires greater base accuracy to account for this reduction over time. Current electronic actuator art is not utilizing the already existing select position mechanical centering at the rooster comb already in the marketplace.

Current attempts to allow for position control at the rooster comb result in larger electric motors with lower cogging torque and lower gear ratios, adding additional expense.

Accordingly, there exists a need for an electronic park lock actuator which is able to work with existing mechanical systems (i.e., with a rooster comb) adding low-cost electronic functionality for modern vehicles.

SUMMARY OF THE INVENTION

In one embodiment, the present invention is an electronic park lock actuator which provides an electronic actuator solution utilizing mechanical solutions for park detent with position hold. The electronic park lock actuator of the present invention allows the use of a smaller sized and higher cogging torque motor with a higher gear ratio, because the back-driving of the motor is not necessary.

In an embodiment, the present invention includes a slot designed into the actuator to allow the external spring-loaded mechanical detent to achieve its lowest energy position. In an embodiment, the electronic park lock actuator of the present invention allows for a higher ratio and smaller motor, preventing the actuator from being back driven beyond the range of the slot.

In an embodiment, the electronic park lock actuator of the present invention involves a limited rotary movement on an electrically driven actuator.

In an embodiment, the electronic park lock actuator of the present invention is a two-part actuator. One part of the actuator includes an integrated pin and another part includes an integrated slot, such as a gear with a pin and an output shaft with a slot.

In the embodiment of a two-part actuator, when the actuator drives the integrated pin, the pin slides on the slot and drives the part having the slot until a spring-loaded rooster comb crests the cam. The rest of the actuation is driven down to the cam trough on the rooster comb by means of the spring. This only rotates the part having the slot (load side) while the part having the pin (drive side) remains fixed.

The actuator of the present invention has the ability to reach park detents using a smaller motor and higher gear ratio, and reduces the mechanical and software design complexity. Furthermore, the electronic park actuator of the present invention limits the amount of back drivable range (unable to perform an external park to neutral shift) for theft deterrence, and also allows operation (speed performance) and a lower motor peak current.

In an embodiment, the present invention is an electronic parking pawl actuator, including an electric motor, a worm gear, the worm gear operable for being driven by the electric motor, and a drive mechanism, the drive mechanism operable for being driven by the worm gear. The drive mechanism is engaged with a detent selector of a transmission, and the drive mechanism is rotatable relative to the worm gear, facilitating movement of the detent selector to be in a desired position.

An aperture is integrally formed as part of the drive mechanism, and a pin integrally formed as part of the worm gear. The pin extends into the aperture such that the pin moves in the aperture as the worm gear rotates relative to the drive mechanism, and the detent selector moves to the desired position. A first key stop is integrally formed as part of the worm gear, and a second key stop integrally formed as part of the drive mechanism. The first key stop is selectively engaged with the second key stop as the worm gear rotates relative to the drive mechanism.

In an embodiment, the present invention is an electronic parking pawl actuator, which includes an electric motor, a worm gear operable for being rotated by the electric motor, and a drive mechanism operable for being rotated by the worm gear. The electric motor rotates the worm gear such that the drive mechanism is rotated to configure a gear selector linkage component such that a transmission operates in a desired gear.

A first key stop and a second key stop are integrally formed as part of the worm gear, and first outer flange and a second outer flange are integrally formed as part of the drive mechanism. The combined circumferential length of the first key stop, the second key stop, the first outer flange, and the second outer flange is less than 360°, such that there is relative rotation between the worm gear and the drive mechanism when the first outer flange is not in contact with the first key stop and the second key stop, and the second outer flange is not in contact with the first key stop and the second key stop.

In an embodiment, as the worm gear is rotated in the first direction and the first key stop is in contact with the second outer flange and the second key stop is in contact with the first outer flange, rotational force is transferred from the first key stop to the second outer flange, and rotational force is transferred from the second key stop to the first outer flange. As the worm gear is rotated in the second direction and the first key stop is in contact with the first outer flange and the second key stop is in contact with the second outer flange, rotational force is transferred from first key stop to the first outer flange and rotational force is transferred from the second key stop to the second outer flange.

A first spring is in contact with the first outer flange and the second key stop, and a second spring is in contact with the second outer flange and the first key stop. The first spring and the second spring are compressed as the worm gear is rotated in the first direction and there is relative rotation between the worm gear and the drive mechanism as the gear selector linkage component changes position, such that the amount of rotational force applied to the drive mechanism continues to increase as the first spring is compressed and the second spring is compressed, and the drive mechanism rotates and changes the position of the gear selector linkage component to configure the transmission for operating in the desired gear. The compressive force in the first spring and the second spring is reduced once the gear selector linkage component is positioned such that the transmission is configured to operate in the desired gear.

In an embodiment, a first capturing groove is integrally formed as part of the first outer flange, and the first spring is partially disposed in the first capturing groove. A first end wall is integrally formed as part of the first capturing groove, and the first end of the first spring is in contact with the first end wall, and the second end of the first spring is in contact with the second key stop. A second capturing groove is integrally formed as part of the second outer flange, and the second spring partially disposed in the second capturing groove. A second end wall is integrally formed as part of the second capturing groove, and the first end of the second spring is in contact with the second end wall, and the second send of the second spring is in contact with the first key stop. As the worm gear is rotated in the first direction, the first end wall and the second key stop apply force to and compress the first spring, and the second end wall and the first key stop apply force to and compress the second spring.

In an embodiment, the drive mechanism includes a notch integrally formed as part of the first key stop, and a notch integrally formed as part of the second key stop. The second end of the first spring is in contact with the notch formed as part of the second key stop, and the second end of the second spring is in contact with the notch formed as part of the first key stop.

In an embodiment, the present invention is an electronic parking pawl actuator, including an electric motor, a worm gear operable for being rotated by the electric motor, a drive mechanism operable for being rotated by the worm gear, a first spring, and a second spring. A first end wall is integrally formed as part of the drive mechanism, and a first end of the first spring is in contact with the first end wall integrally formed as part of the drive mechanism. A second end wall is integrally formed as part of the drive mechanism, and a second end of the second spring is in contact with the second end wall integrally formed as part of the drive mechanism.

A first recess is integrally formed as part of the drive mechanism, and the first spring partially disposed in the first recess. A second recess is integrally formed as part of the drive mechanism, and the second spring is partially disposed in the second recess.

A first end wall is integrally formed as part of the first recess, and a second end of the first spring is in contact with the first end wall formed as part of the first recess.

A second end is wall integrally formed as part of the second recess, and a first end of the second spring is in contact with the second end wall integrally formed as part of the second recess.

Compressive force in the first spring is increased as the worm gear is rotated in the first direction and there is relative rotation between the worm gear and the drive mechanism, and compressive force in the second spring is increased as the worm gear is rotated in the second direction and there is relative rotation between the worm gear and the drive mechanism.

In an embodiment, as the gear selector linkage component changes position when the worm gear is rotated in the first direction, such that the amount of rotational force applied to the drive mechanism continues to increase as the first spring is compressed, and the drive mechanism rotates and changes the position of the gear selector linkage component to configure the transmission for operating in the desired gear, and the compressive force in the first spring reduced once the gear selector linkage component is positioned such that the transmission is configured to operate in the desired gear.

In an embodiment, as the gear selector linkage component changes position when the worm gear is rotated in the second direction, such that the amount of rotational force applied to the drive mechanism continues to increase as the second spring is compressed, and the drive mechanism rotates and changes the position of the gear selector linkage component to configure the transmission for operating in the desired gear, and the compressive force in the second spring is reduced once the gear selector linkage component is positioned such that the transmission is configured to operate in the desired gear.

In one embodiment, a circumferential flange integrally formed as part of the drive mechanism. A first capturing groove is integrally formed as part of the circumferential flange, and the first spring partially disposed in the first capturing groove. A second capturing groove is integrally formed as part of the circumferential flange, and the second spring is partially disposed in the second capturing groove. The first end wall is integrally formed as part of the first capturing groove, and the second end wall is integrally formed as part of the second capturing groove.

In an embodiment, a first pin is connected to the circumferential flange, and a second pin is connected to the circumferential flange. A first arc-shaped slot is integrally formed as part of the worm gear, and the first pin slidably disposed in the first arc-shaped slot. A second arc-shaped slot integrally formed as part of the worm gear, and the second pin slidably disposed in the second arc-shaped slot. The electric motor rotates the worm gear such that the drive mechanism is rotated to configure a transmission to operate in a desired gear, and the first pin moves in the first slot and the second pin moves in the second slot when there is relative rotation between the worm gear and the drive mechanism.

In an embodiment, the drive mechanism includes a first outer flange and a second outer flange. A first capturing groove is integrally formed as part of the first outer flange, and the first spring partially disposed in the first capturing groove. A second capturing groove is integrally formed as part of the second outer flange, and the second spring is partially disposed in the second capturing groove. The first end wall is integrally formed as part of the first capturing groove, and the second end wall is integrally formed as part of the second capturing groove.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2B is a second exploded view of a second embodiment of an electronic parking pawl actuator, according to embodiments of the present invention;

FIG. 2C is an enlarged exploded view of a portion of a second embodiment of an electronic parking pawl actuator, according to embodiments of the present invention;

FIG. 4C is a second exploded view of a fourth embodiment of an electronic parking pawl actuator, according to embodiments of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
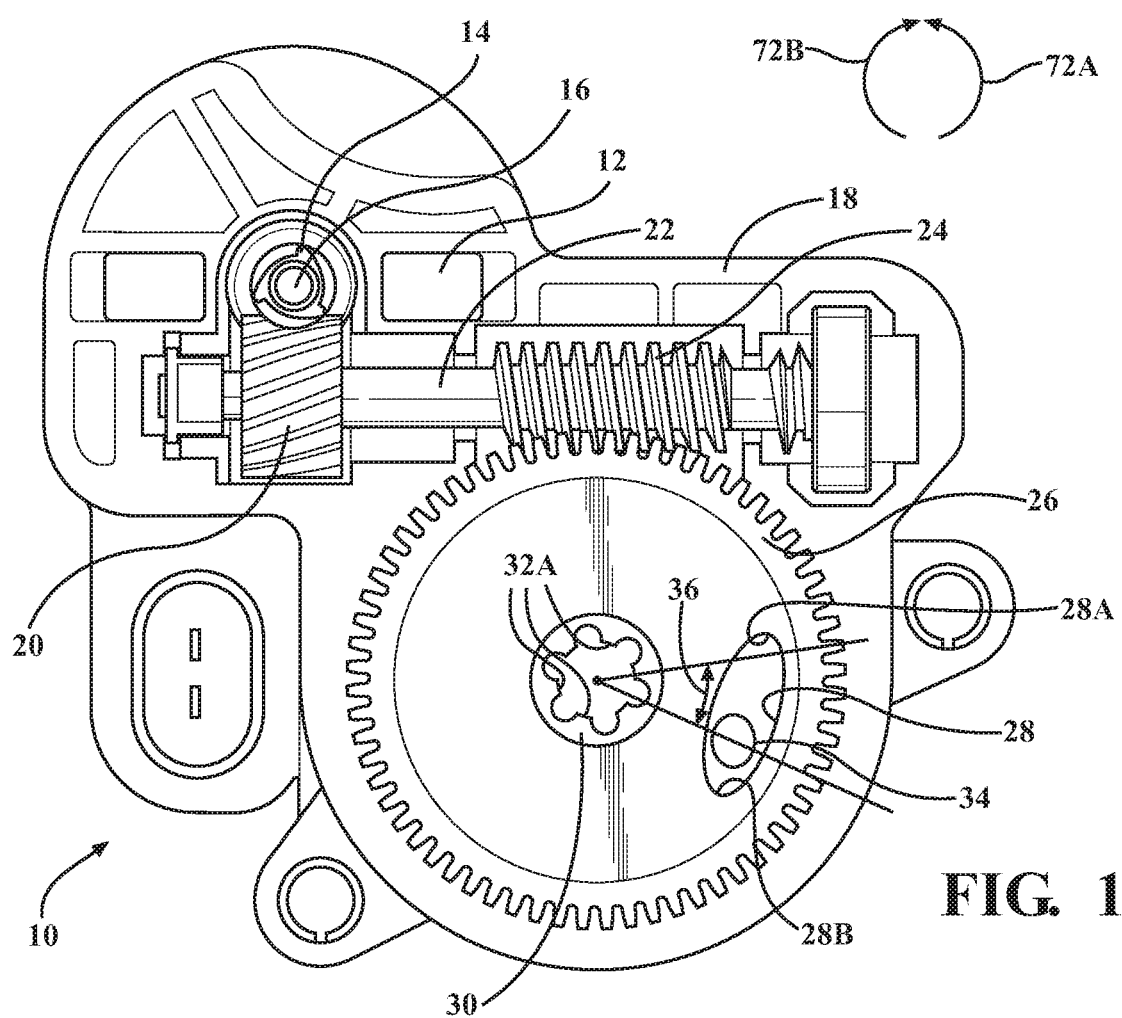
FIG. 1 is a front view of a first embodiment of a parking pawl actuator, according to embodiments of the present invention.

A first embodiment of an electronic parking pawl actuator according to the present invention is shown in FIG. 1, generally at 10. The actuator 10 includes an electric motor 12 having a worm gear 14 mounted on a shaft 16. The motor 12 is connected to a housing 18 such that the shaft 16 extends through the housing 18.

The worm gear 14 is in mesh with a worm gear 20, and the worm gear 20 is mounted on a shaft 22. Formed as part of the shaft 22 is a second-stage worm gear 24, and the second-stage worm gear 24 is in mesh with another second-stage worm gear 26. Integrally formed with the second-stage worm gear 26 is a pin 34, which is used to couple the second-stage worm gear 26 to a drive mechanism 30 having a spline joint 32A, where the spline joint 32A is integrally formed as part of an output shaft (not shown in FIG. 1).

The spline joint 32A of the drive mechanism 30 is connected to a corresponding spline joint of an output shaft of a detent selector, or "rooster comb," inside the transmission, where the rooster comb is connected to other shift linkage components. An example of a rooster comb is shown in U.S. patent application Ser. No. 10/460,043, the entire specification of which is incorporated herein by reference. The drive mechanism 30 includes an aperture 28, which in this embodiment is in the shape of an ellipse. However, it is within the scope of the invention that other shapes may be used. The pin 34 extends into the aperture 28 to couple the second-stage worm gear 26 to the drive mechanism 30. The configuration of the pin 34 extending into the aperture 28 is such that as the drive mechanism 30 rotates relative to the second-stage worm gear 26, the pin 34 moves in the aperture 28. The allowed relative rotation between the drive mechanism 30 and the second-stage worm gear 26 corresponds to the size of the aperture 28. More specifically, the pin 34, and therefore the rest of the second-stage worm gear 26, is able to rotate relative to the drive mechanism 30 an angular distance shown by angle 36. The allowed rotation of the second-stage worm gear 26 relative to the drive mechanism 30 allows for the output shaft of the detent selector of the transmission to be placed in a position such that the correct detent location of gear selector may be achieved.

During operation, the motor 12 rotates the worm gear 14, which in turn rotates the worm gear 20, the shaft 22, and the second-stage worm gear 24, and causes rotation of the second-stage worm gear 26. The motor 12 may be operated such that the second-stage worm gear 26 may be rotated in a first direction (counterclockwise), indicated by arrow 72A, or a second direction (clockwise), indicated by arrow 72B.

When the second-stage worm gear 26 is rotated in the first direction 72A, the pin 34 applies force to the first end 28A of the aperture 28. The rotational force applied to the first end 28A of the aperture 28 is transferred to the drive mechanism 30, and more specifically, the spline joint 32A, such that the second-stage worm gear 26 and the drive mechanism 30 rotate in unison in the first direction 72A. The drive mechanism 30 and rooster comb then rotate, configuring the transmission to the desired gear.

When the second-stage worm gear 26A is rotated in the second direction 72B, the pin 34 applies force to the second end 28B of the aperture 28. Again, the rotational force applied to the second end 28B of the aperture 28 is transferred to the drive mechanism 30, and more specifically, the spline joint 32A, such that the second-stage worm gear 26 and the drive mechanism 30 rotate in unison in the second direction 72B. The drive mechanism 30 and rooster comb then rotate, configuring the transmission to the desired gear.

There are also instances during the operation of the electronic parking pawl actuator 10 where there is relative rotation between the second-stage worm gear 26 and the drive mechanism 30 when the second-stage worm gear 26 is rotated in either the first direction 72A, or the second direction 72B. The rooster comb includes several peaks and troughs which are adjacent to one another, and a gear selector linkage component is engaged with one of the troughs, depending upon how the transmission is configured to operate (i.e., Park, Reverse, Neutral, Drive, Low). The electronic parking pawl actuator 10 is used to rotate the rooster comb, and move the gear selector linkage component between the various peaks and troughs to change the mode of operation of the transmission. The relative rotation between the second-stage worm gear 26 and the drive mechanism 30 (when the second-stage worm gear 26 is rotated) occurs when the space between the aperture 28 and the pin 34 is being bridged. Such a scenario is a result of when the second-stage worm gear 26 reverses direction.

This scenario is also the result of when the gear selector linkage component moves from the top of one of the peaks of the rooster comb into one of the troughs of the rooster comb. The movement of the gear selector linkage component from the top of one of the peaks of the rooster comb to one of the troughs of the rooster comb causes the rooster comb and the drive mechanism 30 to rotate slightly faster than the second-stage worm gear 26. Once the gear selector linkage component has moved to the desired trough, and the transmission is configured to operate in the desired gear, the rotation of the second-stage worm gear 26 is stopped.

Figure 2A:
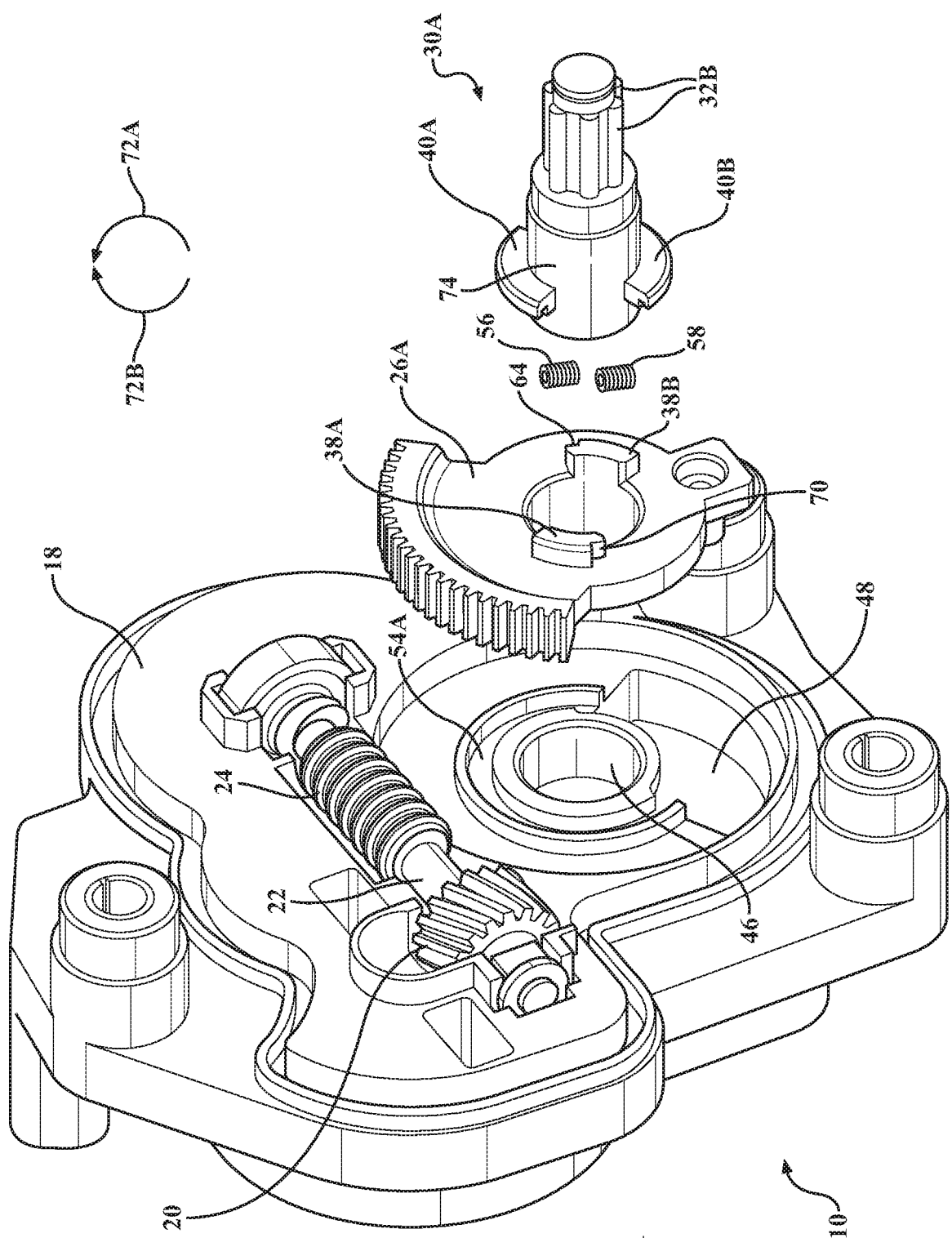
FIG. 2A is a first exploded view of a second embodiment of an electronic parking pawl actuator, according to embodiments of the present invention.

Another embodiment of the present invention is shown in FIGS. 2A-2C, with like numbers referring to like elements. In this embodiment, an alternate embodiment of the second-stage worm gear 26 and drive mechanism 30 are shown. The second-stage worm gear 26A in FIGS. 2A-2C includes two key stops 38A, 38B, and the drive mechanism 30A also includes two corresponding outer flanges 40A, 40B, which are selectively in contact with one another. More specifically, the combined circumferential length of the key stops 38A,38B, and the outer flanges 40A, 40B is less than 360°, as indicated by the angle 42, which allows for the second-stage worm gear 26A and the drive mechanism 30A to rotate relative to one another. The allowed rotation of the second-stage worm gear 26A relative to the drive mechanism 30A allows for the output shaft of the gear selector of the transmission to be placed in a position such that the correct detent location of gear selector may be achieved.

The second-stage worm gear 26A includes a cylindrical portion 44 which is hollow and formed as part of the second-stage worm gear 26A, and the cylindrical portion 44 extends into an aperture 46 formed as part of the housing 18. There is also an angular groove portion 48 integrally formed with the housing 18, and a pin 50 integrally formed as part of the second-stage worm gear 26A is disposed in the angular groove portion 48. The pin 50 being located in the angular groove portion 48 limits the rotation of the second-stage worm gear 26A to a maximum amount of rotation. Connected to the pin 50 is a sensor (not shown) which is used to detect the position of the pin 50 and therefore the position of the second-stage worm gear 26A. The position of the pin 50 is detected by various circuitry connected to a circuit board 52.

Also formed as part of the housing 18 is a groove 54A and disposed in the groove 54A is a portion of a circular flange 54B, which is integrally formed as part of the second-stage worm gear 26A. The position of the cylindrical portion 44 in the aperture 46 and the circular flange 54B being located in the groove 54A guide the movement of the second-stage worm gear 26A as the second-stage worm gear 26A rotates relative to the housing 18.

In the embodiment shown in FIGS. 2A-2C, there is a pair of springs 56,58. The first spring 56 is partially disposed in a first capturing groove 60, which is semi-circular in shape such that approximately half of the first spring 56 is disposed in the first capturing groove 60. The first capturing groove 60 is integrally formed as part of the outer flange 40A, such that the first capturing groove 60 extends the entire length of the outer flange 40A. Also, integrally formed as part of the outer flange 40A is a first end wall 62, which is integrally formed with the first capturing groove 60 and is also semi-circular in shape to correspond to the shape of the first capturing groove 60. The first spring 56 is disposed in the first capturing groove 60 such that a first end 56A of the first spring 56 is in contact with the first end wall 62. A second end 56B of the first spring 56 is in contact with a notch 64 formed as part of the key stop 38B.

The second spring 58 is also partially disposed in a second capturing groove 66, which is also semi-circular in shape such that approximately half of the second spring 58 is disposed in the second capturing groove 66. The second capturing groove 66 is integrally formed as part of the outer flange 40B, such that the second capturing groove 66 extends the entire length of the outer flange 40B. Also, integrally formed as part of the outer flange 40B is a second end wall 68, which is integrally formed with the second capturing groove 66, and is also semi-circular in shape to correspond to the shape of the second capturing groove 66. The second spring 58 is disposed in the second capturing groove 66 such that a first end 58A of the second spring 58 is in contact with the second end wall 68. A second end 58B of the second spring 58 is in contact with a notch 70 formed as part of the key stop 38A.

During operation, as with the previous embodiment, the motor 12 rotates the worm gear 14, which in turn rotates the worm gear 20, the shaft 22, and the second-stage worm gear 24, and causes rotation of the second-stage worm gear 26A. Again, the motor 12 may be operated such that the second-stage worm gear 26A may be rotated in a first direction (counterclockwise), indicated by arrow 72A, or a second direction (clockwise), indicated by arrow 72B.

Initially, when there is no compressive force in the springs 56,58, the key stop 38A is in contact with the outer flange 40A and the key stop 38B is in contact with the outer flange 40B. When the second-stage worm gear 26A is rotated in the first direction 72A, the key stop 38A applies force to the second spring 58, such that the second spring 58 applies force to the second end wall 68 of the outer flange 40B, and the key stop 38B to apply force to the first spring 56, such that the first spring 56 applies force to the first end wall 62. The drive mechanism 30A has an output shaft 74, and the outer flanges 40A, 40B are integrally formed as part of the output shaft 74. Part of the output shaft 74 extends into the cylindrical portion 44 of the second-stage worm gear 26A. As with the previous embodiment, the drive mechanism 30A also includes a spline joint 32B which is engaged with a detent selector or rooster comb inside the transmission, where the rooster comb is engaged with the gear selector linkage component. The force applied to the first end wall 62 and the second end wall 68 is transferred to the outer flanges 40A, 40B, respectively, the output shaft 74, and the spline joint 32B. Then the drive mechanism 30A and rooster comb rotate in unison, configuring the transmission to the desired gear.

However, there may be instances where there is resistance against the movement of the rooster comb, such as when the gear selector linkage component is engaged with one of the troughs of the rooster comb. The resistance against the rotation of the rooster comb results in relative rotation between the second-stage worm gear 26A and the drive mechanism 30A as the second-stage worm gear 26A rotates in the first direction 72A (i.e., the drive mechanism 30A remains stationary and the second-stage worm gear 26A continues to rotate). This relative rotation between the second-stage worm gear 26A and the drive mechanism 30A when the second-stage worm gear 26A is rotated in the first direction 72A results in an increase in the compressive force in the first spring 56 and the second spring 58, increasing the amount of force applied to the first end wall 62 by the first spring 56, and increasing the amount of force applied to the second end wall 68 by the second spring 58. The compression in the springs 56, 58 continues to increase as the second-stage worm gear 26A is rotated in the first direction 72A relative to the drive mechanism 30A. The compression in the springs 56, 58 applies rotational force to the drive mechanism 30A such that the drive mechanism 30A applies rotational force to the rooster comb. Once the second-stage worm gear 26A has been rotated enough such that the compression in the springs 56, 58 has increased and there is enough rotational force applied to the drive mechanism 30A and therefore the rooster comb to rotate the drive mechanism 30A and the rooster comb such that the gear selector linkage component moves out of the trough of the rooster comb, and onto one of the peaks of the rooster comb, and then into another of the troughs of the rooster comb. As the gear selector linkage component moves from the peak to the trough, the rooster comb and drive mechanism 30A temporarily rotate faster than the second-stage worm gear 26A such that the compressive force on the springs 56, 58 is reduced or eliminated. This process may be repeated as the drive mechanism 30A and rooster comb are rotated in the first direction 72A until the transmission is configured to operate in a desired gear.

The electronic parking pawl actuator 10 is also operable to rotate the second-stage worm gear 26A the second direction 72B. When the second-stage worm gear 26A is rotated in the second direction 72B, if there is any compression force in the springs 56,58, the second-stage worm gear 26A is positioned relative to the drive mechanism 30A such that the compression force in the springs 56, 58 is minimized or eliminated completely, the key stop 38A of the second-stage worm gear 26A contacts the outer flange 40A and the key stop 38B of the second-stage worm gear 26A contacts the outer flange 40B. When the key stop 38A of the second-stage worm gear 26A contacts the outer flange 40A, and the key stop 38B of the second-stage worm gear 26A contacts the outer flange 40B, the rotation of the second-stage worm gear 26A causes rotational force to be transferred from the key stop 38A to the outer flange 40A and rotational force to be transferred from the key stop 38B to the outer flange 40B, where the second-stage worm gear 26A and the drive mechanism 30A (and the rooster comb) to rotate in unison, which again configures the transmission to operate in a desired gear.

However, during the rotation of the second-stage worm gear 26A in the second direction, as the gear selector linkage component moves from a peak to a trough, the rooster comb and drive mechanism 30A temporarily rotate faster than the second-stage worm gear 26A such that the key stop 38A is no longer in contact with the outer flange 40A and the key stop 38B is no longer in contact with the outer flange 40B. As this occurs, second end wall 68 of the outer flange 40B applies force to the second spring 58, such that the second spring 58 applies force to the key stop 38A, and the first end wall 62 applies force to the first spring 56, such that the first spring 56 applies force to the key stop 38B. As the gear selector linkage component continues to move towards the trough of the rooster comb, the rooster comb and drive mechanism 30A continue to rotate relative to the second-stage worm gear 26A, which results in compression of the springs 56, 58. The compression of the springs 56, 58 functions to prevent unwanted noise from occurring as the gear selector linkage component moves toward the trough of the rooster comb properly. The springs 56, 58 act as dampers, preventing harsh engagement between the rooster comb and the gear selector linkage component when the second-stage worm gear 26A in the second direction. The springs 56, 58 dampen out the high-speed shifts and also to decelerate the rotation of the output shaft 74 of the drive mechanism 30A when gear selector linkage component races towards the low-energy state when the gear selector linkage component moves towards the bottom of one of the troughs of the rooster comb.

Figure 3A:
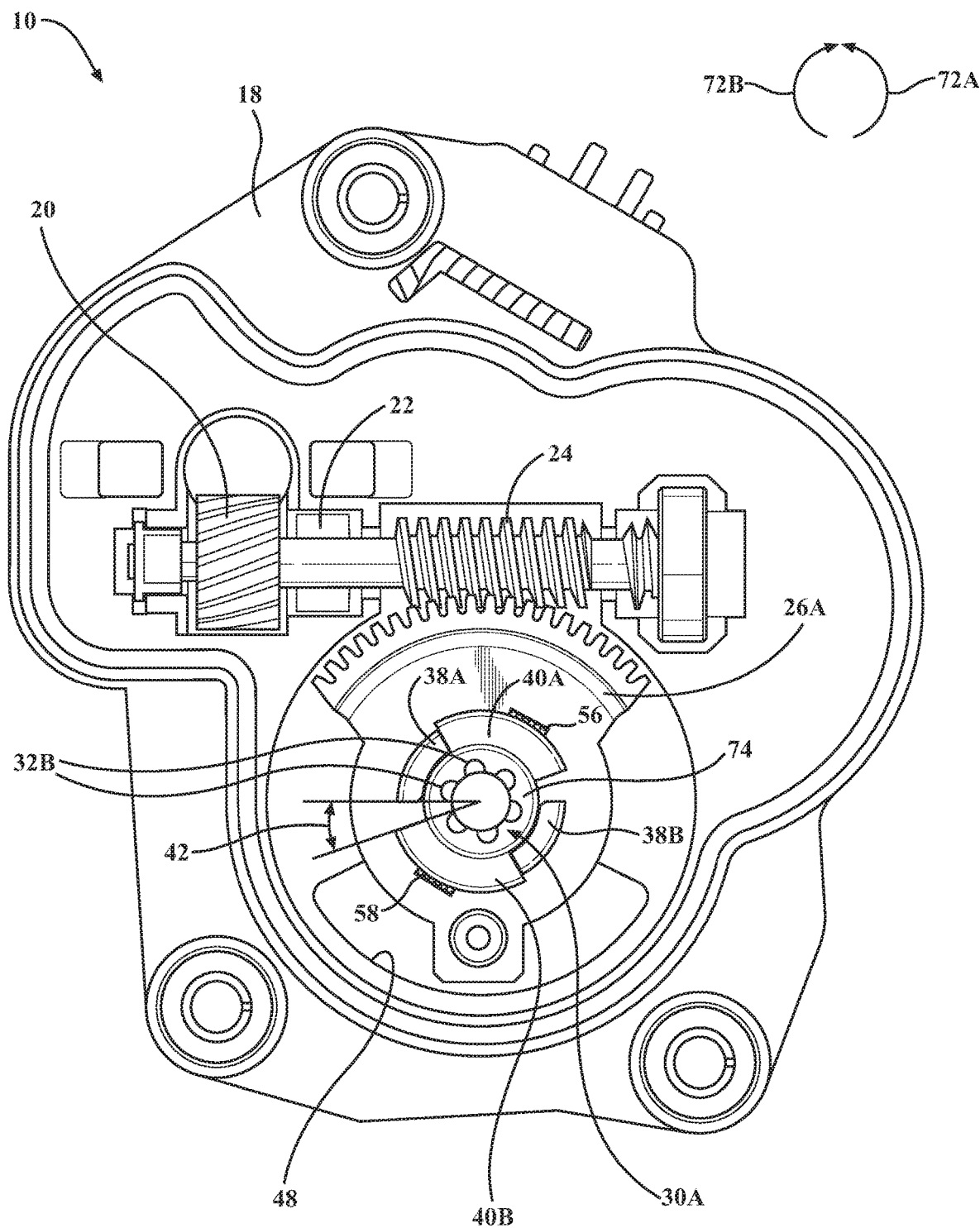
FIG. 3A is a front view of a third embodiment of an electronic parking pawl actuator, according to embodiments of the present invention.
Figure 3B:
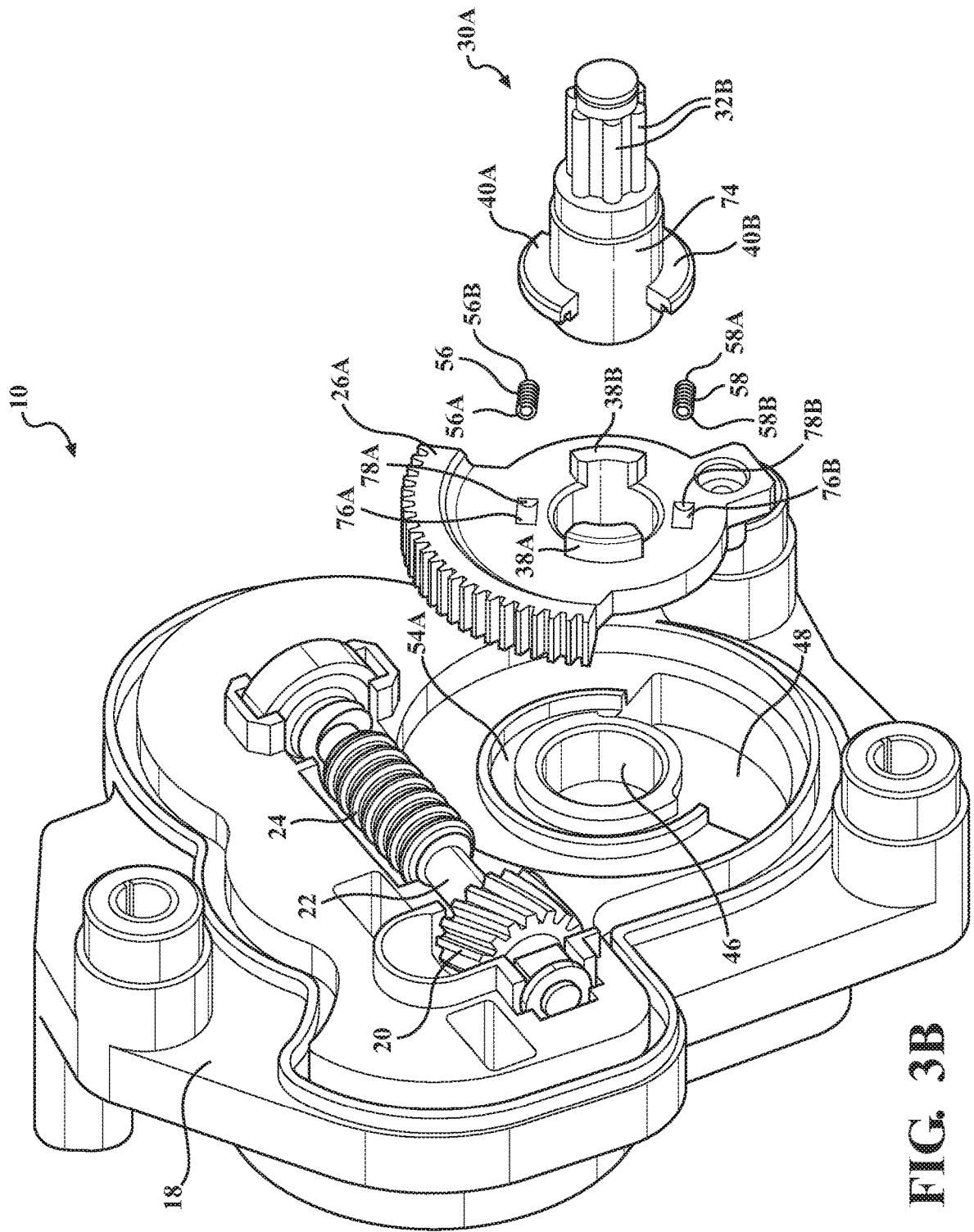
FIG. 3B is an exploded view of a third embodiment of an electronic parking pawl actuator, according to embodiments of the present invention.

Another embodiment of the present invention is shown in FIGS. 3A-3B, with like numbers referring to like elements. In this embodiment, the drive mechanism 30A includes the grooves 60, 66 and the end walls 62, 68 formed as part of the outer flanges 40A, 40B, respectively. However, in this embodiment, the springs 56, 58 are configured to provide the dampening function when the second-stage worm gear 26A is rotated in both directions 72A, 72B. Approximately half of the first spring 56 is also disposed in the first capturing groove 60, and the first end 56A of the first spring 56 is in contact with the first end wall 62. Also, approximately half of the second spring 58 is disposed in the second capturing groove 66, and the first end 58A of the second spring 58 is in contact with the second end wall 68.

However, in this embodiment, the key stops 38A, 38B do not have notches, but rather there is a first recess 76A and a second recess 76B, where both recesses 76A, 76B are integrally formed as part of the second-stage worm gear 26A. Each of the recesses 76A, 76B are semi-circular in shape, corresponding to the shape of the springs 56, 58. When assembled, approximately half of the first spring 56 is disposed in the first recess 76A, and half of the first spring 56 is disposed in the first capturing groove 60. Similarly, approximately half of the second spring 58 is disposed in the second recess 76B, and half of the second spring 58 is disposed in the second capturing groove 66. The recess 76A includes an end wall 78A, and the second end 56B of the first spring 56 is in contact with the end wall 78A. As with the previous embodiment, the first end 56A of the first spring 56 is in contact with the first end wall 62.

However, in this embodiment, the other recess 76B also includes an end wall 78B, and the second spring 58 is arranged in a different part of the second capturing groove 66 (compared to the previous embodiment) such that the first end 58A of the second spring 58 is in contact with the end wall 78B, and the second end 58B of the second spring 58 is in contact with the second end wall 68.

The springs 56, 58 are located in the recesses 76A, 76B and the capturing grooves 60, 66 such that the springs 56,58 are under constant compression, which is increased or reduced, depending on the direction of rotation of the second-stage worm gear 26A, and relative rotation between the second-stage worm gear 26A and the drive mechanism 30A.

As with the previous embodiment, the motor 12 may be operated such that the second-stage worm gear 26A may be rotated in the first direction 72A, or the second direction 72B. In this embodiment, when the second-stage worm gear 26A is rotated in the first direction 72A, and the gear selector linkage component is engaged with one of the troughs of the rooster comb, resistance against the rotation of the rooster comb results in relative rotation between the second-stage worm gear 26A and the drive mechanism 30A (i.e., the drive mechanism 30A remains stationary and the second-stage worm gear 26A continues to rotate). This relative rotation between the second-stage worm gear 26A and the drive mechanism 30A when the second-stage worm gear 26A is rotated in the first direction 72A results in the end walls 62, 78A moving towards one another, increasing the compressive force applied to the first spring 56. As this occurs, the end wall 78B and the second end wall 68 move away from one another, and the amount of force applied to the second spring 58 by the end wall 78B and the second end wall 68 is reduced.

Once enough force is applied to the drive mechanism 30A and the rooster comb, the gear selector linkage component moves from the trough to one of the peaks of the rooster comb. Once the gear selector linkage component has moved past the peak, the gear selector linkage component then proceeds to move from the peak to the next trough, the rooster comb and drive mechanism 30A temporarily rotate faster than the second-stage worm gear 26A such that the compressive force applied to the first spring 56 is reduced, while simultaneously increasing the compressive force applied to the second spring 58. The increase in compressive force on the second spring 58 limits how much faster the rooster comb and drive mechanism 30A may rotate compared to the second-stage worm gear 26A, and provides a smoother movement of the gear selector linkage component into the next trough. The second spring 58 therefore functions as a damper when the second-stage worm gear 26A is rotated in the first direction 72A.

When the second-stage worm gear 26A is rotated in the second direction 72B, and the gear selector linkage component is engaged with one of the troughs of the rooster comb, resistance against the rotation of the rooster comb results in relative rotation between the second-stage worm gear 26A and the drive mechanism 30A (i.e., the drive mechanism 30A remains stationary and the second-stage worm gear 26A continues to rotate). This relative rotation between the second-stage worm gear 26A and the drive mechanism 30A when the second-stage worm gear 26A is rotated in the second direction 72B results in the end walls 68, 78B moving towards one another, increasing the compressive force applied to the second spring 58. As this occurs, the end wall 78A and the first end wall 62 move away from one another, and the amount of force applied to the first spring 56 by the end wall 78A and the first end wall 62 is reduced.

Again, once enough force is applied to the drive mechanism 30A and the rooster comb, the gear selector linkage component moves from the trough to one of the peaks of the rooster comb. Once the gear selector linkage component has moved past the peak, the gear selector linkage component then proceeds to move from the peak to the next trough, the rooster comb and drive mechanism 30A temporarily rotate faster than the second-stage worm gear 26A such that the compressive force applied to the second spring 58 is reduced, while simultaneously increasing the compressive force applied to the first spring 56. The increase in compressive force on the first spring 56 limits how much faster the rooster comb and drive mechanism 30A may rotate compared to the second-stage worm gear 26A, and provides a smoother movement of the gear selector linkage component into the next trough. The first spring 56 therefore functions as a damper when the second-stage worm gear 26A is rotated in the second direction 72B.

Once again, when gear selector linkage component has reached the trough corresponding to the desired gear, rotation of the second-stage worm gear 26A may be stopped.

Figure 4A:
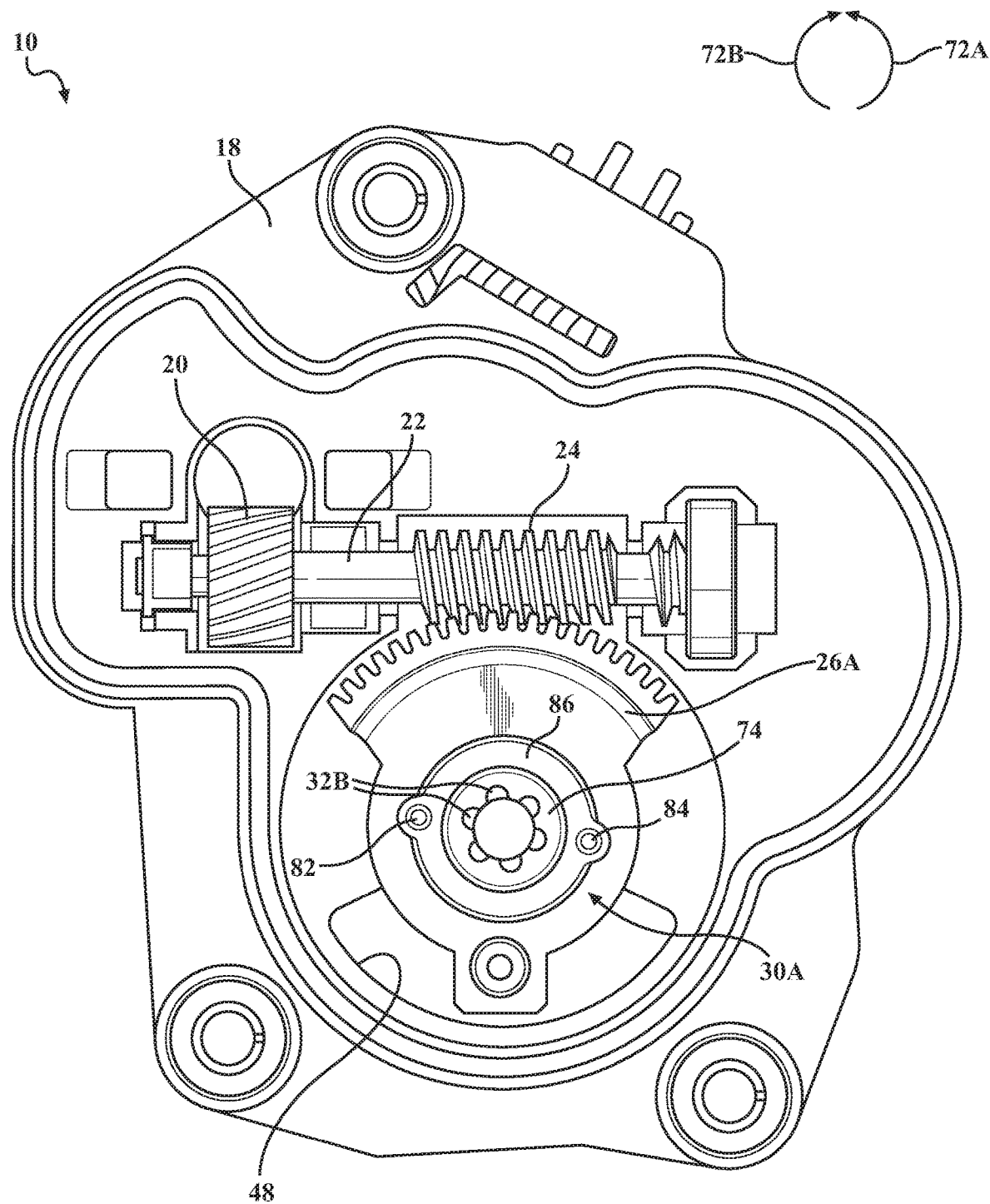
FIG. 4A is a front view of a fourth embodiment of an electronic parking pawl actuator, according to embodiments of the present invention.
Figure 4B:
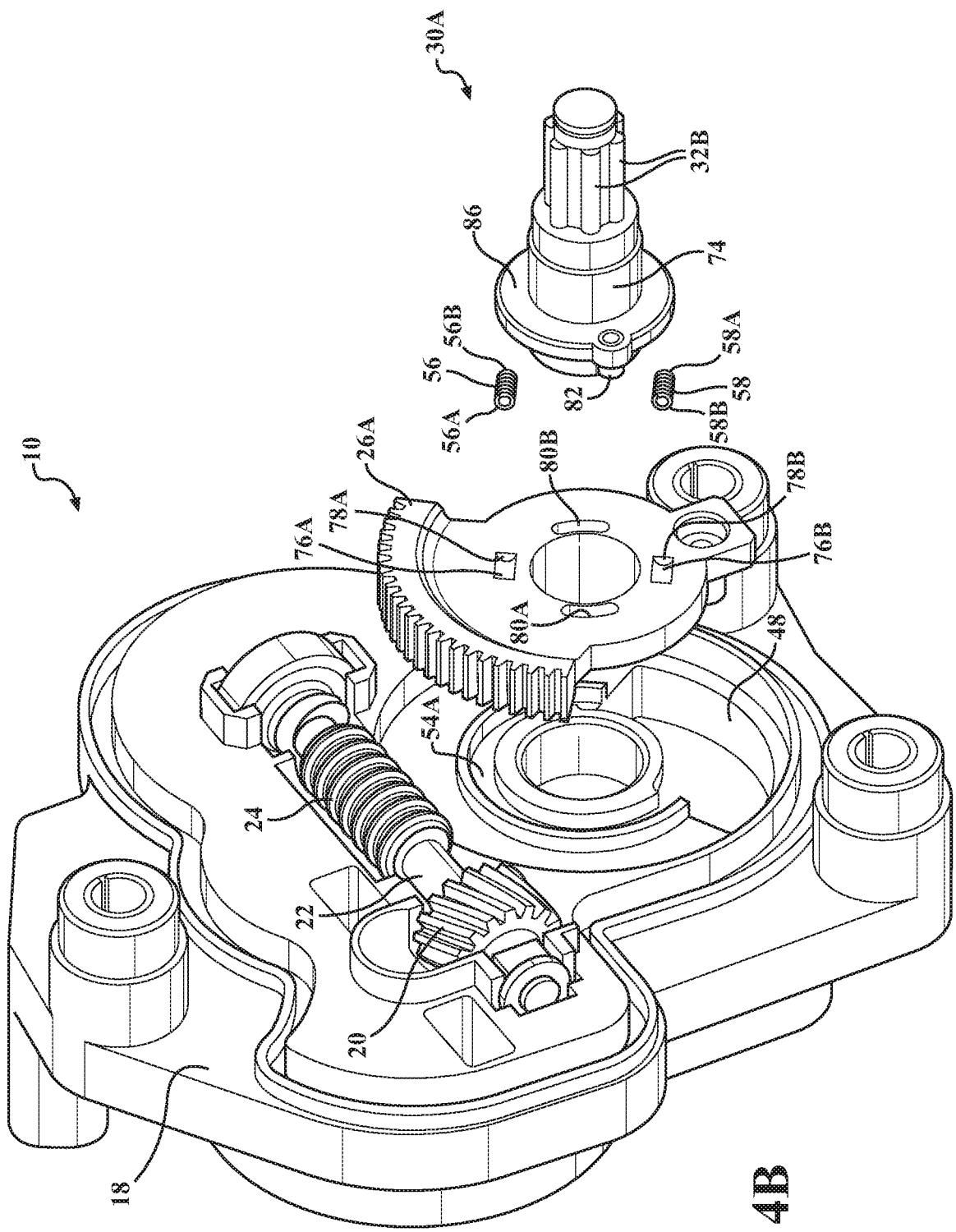
FIG. 4B is a first exploded view of a fourth embodiment of an electronic parking pawl actuator, according to embodiments of the present invention.

Another embodiment of the present invention is shown in FIGS. 4A-4C, with like numbers referring to like elements. This embodiment still includes the recesses 76A, 76B formed as part of the second-stage worm gear 26A, and the springs 56, 58. However, in this embodiment, the second-stage worm gear 26A does not have the key stops 38A, 38B, and the drive mechanism 30A does not have the outer flanges 40A, 40B. In this embodiment, there is a first arc-shaped slot 80A and a second arc-shaped slot 80B. Slidably disposed in the first arc-shaped slot 80A is a first pin 82, and slidably disposed in the second arc-shaped slot 80B is a second pin 84.

Both of the pins 82, 84 are connected to a circumferential flange 86, where the circumferential flange 86 is integrally formed with the output shaft 74 of the drive mechanism 30A. In this embodiment, the first capturing groove 60, the first end wall 62, the second capturing groove 66, and the second end wall 68 are all integrally formed as part of the circumferential flange 86. As with the previous embodiment, approximately half of the first spring 56 is disposed in the first capturing groove 60, and the first end 56A of the first spring 56 is in contact with the first end wall 62, and approximately half of the first spring 56 is disposed in the first recess 76A and the second end 56B of the first spring 56 is in contact with the end wall 78A. Similarly, approximately half of the second spring 58 is also disposed in the second capturing groove 66, but as with the previous embodiment, the second spring 58 is arranged in the second capturing groove 66, such that the second end 58B of the second spring 58 is in contact with the second end wall 68, and approximately half of the second spring 58 is disposed in the second recess 76B, and the first end 58A of the second spring 58 is in contact with the end wall 78B.

When the second-stage worm gear 26A is rotated the first direction, as with the previous embodiment, and the gear selector linkage component is engaged with one of the troughs of the rooster comb, resistance against the rotation of the rooster comb results in relative rotation between the second-stage worm gear 26A and the drive mechanism 30A (i.e., the drive mechanism 30A remains stationary and the second-stage worm gear 26A continues to rotate). This relative rotation between the second-stage worm gear 26A and the drive mechanism 30A when the second-stage worm gear 26A is rotated in the first direction 72A results in the end walls 62, 78A moving towards one another, increasing the compressive force applied to the first spring 56. As this occurs, the end wall 78B and the second end wall 68 move away from one another, and the amount of force applied to the second spring 58 by the end wall 78B and the second end wall 68 is reduced.

Once enough force is applied to the drive mechanism 30A and the rooster comb, the gear selector linkage component moves from the trough to one of the peaks of the rooster comb. Once the gear selector linkage component has moved past the peak, the gear selector linkage component then proceeds to move from the peak to the next trough, the rooster comb and drive mechanism 30A temporarily rotate faster than the second-stage worm gear 26A such that the compressive force applied to the first spring 56 is reduced, while simultaneously increasing the compressive force applied to the second spring 58. The increase in compressive force on the second spring 58 limits how much faster the rooster comb and drive mechanism 30A may rotate compared to the second-stage worm gear 26A, and provides a smoother movement of the gear selector linkage component into the next trough. The second spring 58 therefore functions as a damper when the second-stage worm gear 26A is rotated in the first direction 72A.

When the second-stage worm gear 26A is rotated in the second direction 72B, and the gear selector linkage component is engaged with one of the troughs of the rooster comb, resistance against the rotation of the rooster comb results in relative rotation between the second-stage worm gear 26A and the drive mechanism 30A (i.e., the drive mechanism 30A remains stationary and the second-stage worm gear 26A continues to rotate). This relative rotation between the second-stage worm gear 26A and the drive mechanism 30A when the second-stage worm gear 26A is rotated in the second direction 72B results in the end walls 68, 78B moving towards one another, increasing the compressive force applied to the second spring 58. As this occurs, the end wall 78A and the first end wall 62 move away from one another, and the amount of force applied to the first spring 56 by the end wall 78A and the first end wall 62 is reduced.

Again, once enough force is applied to the drive mechanism 30A and the rooster comb, the gear selector linkage component moves from the trough to one of the peaks of the rooster comb. Once the gear selector linkage component has moved past the peak, the gear selector linkage component then proceeds to move from the peak to the next trough, the rooster comb and drive mechanism 30A temporarily rotate faster than the second-stage worm gear 26A such that the compressive force applied to the second spring 58 is reduced, while simultaneously increasing the compressive force applied to the first spring 56. The increase in compressive force on the first spring 56 limits how much faster the rooster comb and drive mechanism 30A may rotate compared to the second-stage worm gear 26A, and provides a smoother movement of the gear selector linkage component into the next trough. The first spring 56 therefore functions as a damper when the second-stage worm gear 26A is rotated in the second direction 72B.

Again, when gear selector linkage component has reached the trough corresponding to the desired gear, rotation of the second-stage worm gear 26A may be stopped.

In this embodiment, the amount of relative rotation between the second-stage worm gear 26A and the drive mechanism 30A is limited by the circumferential length of the arc-shaped slots 80A, 80B. The circumferential length of the arc-shaped slots 80A, 80B may be changed to allow for different amounts of relative rotation between the second-stage worm gear 26A and the drive mechanism 30A, to accommodate different shaped rooster combs, and different types of shift linkage components.

In further regard to the embodiments shown in FIGS. 3A-4C, there may be instances where during the movement of the gear selector linkage component moving from the peak to the next trough, the speed at which the rooster comb and drive mechanism 30A temporarily rotate faster than the second-stage worm gear 26A may vary. This variation in relative rotational speed of the rooster comb and drive mechanism 30A relative to the second-stage worm gear 26A may cause fluctuations in the amount of compressive force applied to the springs 56, 58. However, this fluctuation, or oscillation of movement of rooster comb and drive mechanism 30A relative to the second-stage worm gear 26A is reduced as the gear selector linkage component moves from peak to trough, as the springs 56, 58 absorb the oscillations.

Figure 5A:
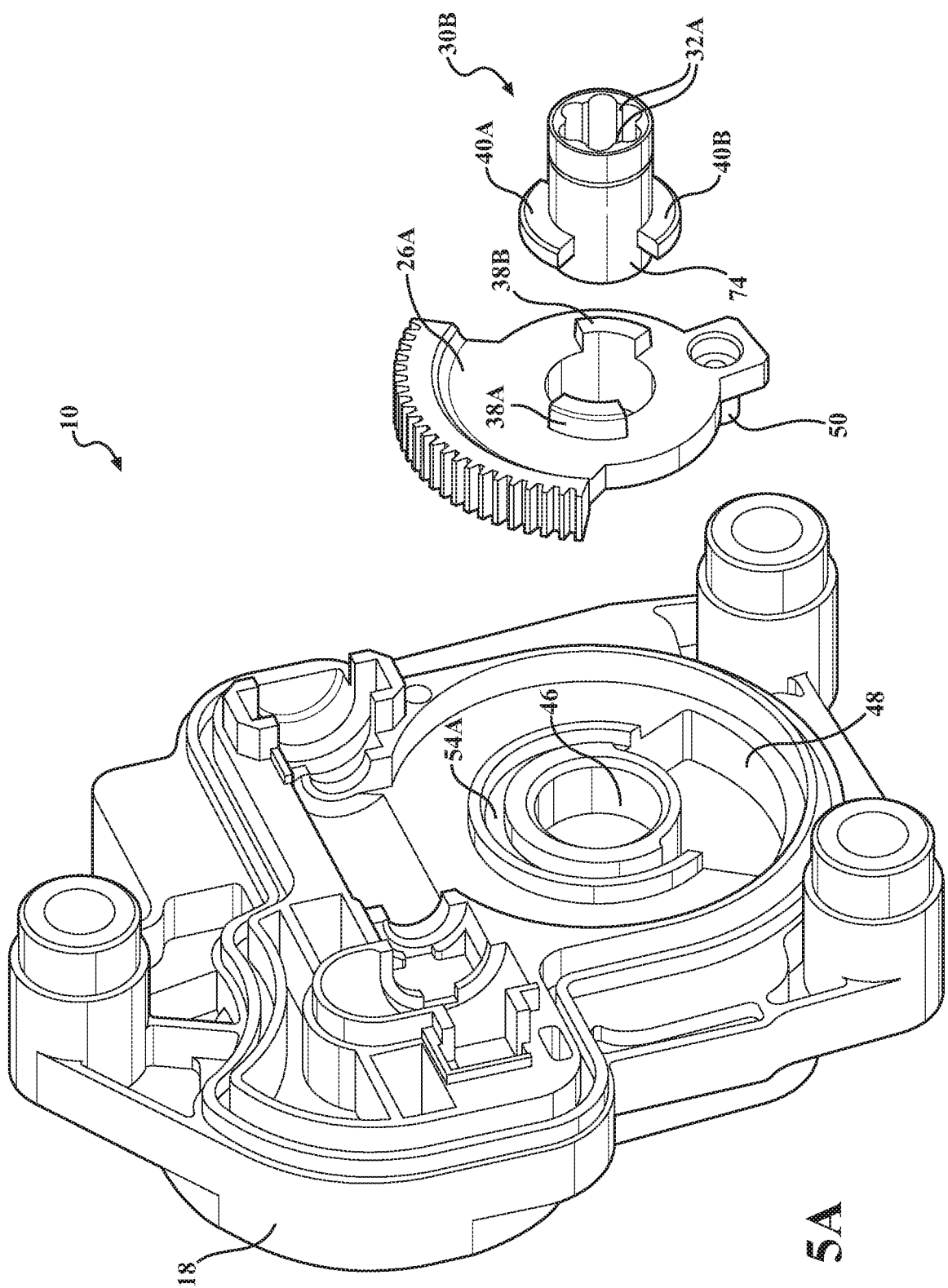
FIG. 5A is an exploded view of a fifth embodiment of an electronic parking pawl actuator, according to embodiments of the present invention.
Figure 5B:
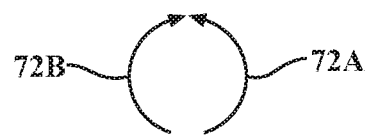
FIG. 5B is a front view of a portion of a fifth embodiment of an electronic parking pawl actuator, according to embodiments of the present invention.
Figure 5B:
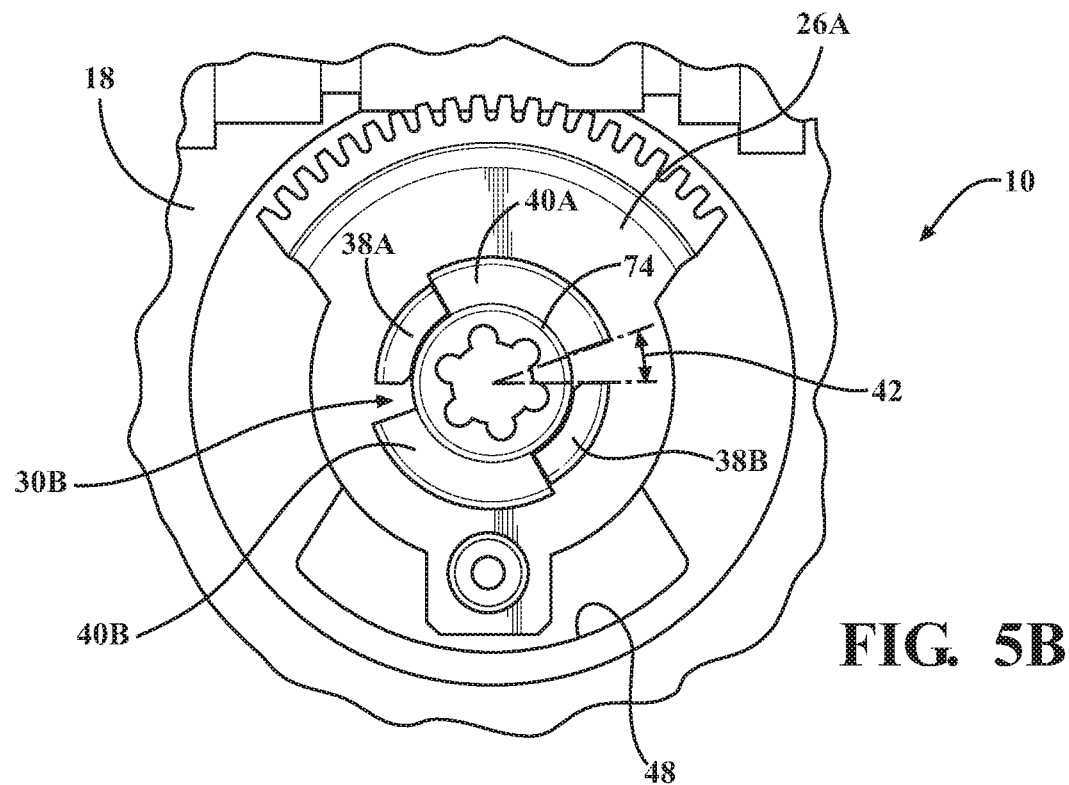

Another embodiment of the present invention is shown in FIGS. 5A-5B, with like numbers referring to like elements. In this embodiment, an alternate embodiment of the second-stage worm gear 26A and drive mechanism 30B are shown. The second-stage worm gear 26A includes the two key stops 38A, 38B, and the drive mechanism 30B includes two outer flanges 40A, 40B, which are selectively in contact with one another. As shown in FIG. 5B, the combined circumferential length of the key stops 38, 40 is less than 360°, which allows for the second-stage worm gear 26A and the drive mechanism 30B to rotate relative to one another, as indicated by the angle 42. The allowed rotation of the second-stage worm gear 26A relative to the drive mechanism 30B allows for the output shaft of the gear selector of the transmission to be placed in a position such that the correct detent location of gear selector may be achieved.

With regard to the embodiments shown in FIGS. 2A-3B and 5A-5B, the amount of relative rotation between the second-stage worm gear 26A and the drive mechanism 30A is limited by the circumferential length of the key stops 38A, 38B and the outer flanges 40A, 40B. The circumferential length of the key stops 38A, 38B and the outer flanges 40A, 40B may be changed to allow for different amounts of relative rotation between the second-stage worm gear 26A and the drive mechanism 30A, to accommodate different shaped rooster combs, and different types of shift linkage components.

It should be noted that in the different embodiments there are internal splines or external splines on the different embodiments of the drive mechanism 30, 30A, 30B. However, it is within the scope of the invention that external splines or internal splines may be used with any of the embodiments of the present invention to accommodate various rooster combs and shift linkage components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    an electronic parking pawl actuator, including:
        an electric motor;
        a worm gear, the worm gear operable for being driven by the electric motor;
        a drive mechanism, the drive mechanism operable for being driven by the worm gear, and the drive mechanism is engaged with a detent selector of a transmission, and the drive mechanism is rotatable relative to the worm gear, facilitating movement of the detent selector to be in a desired position;
    an aperture integrally formed as part of the drive mechanism; and
    a pin integrally formed as part of the worm gear;
    wherein the pin extends into the aperture such that the pin moves in the aperture as the worm gear rotates relative to the drive mechanism, and the detent selector moves to the desired position.

2. An apparatus, comprising:
    an electronic parking pawl actuator, including:
        an electric motor;
        a worm gear, the worm gear operable for being driven by the electric motor;
        a drive mechanism, the drive mechanism operable for being driven by the worm gear, and the drive mechanism is engaged with a detent selector of a transmission, and the drive mechanism is rotatable relative to the worm gear, facilitating movement of the detent selector to be in a desired position;

a first key stop integrally formed as part of the worm gear; and a second key stop integrally formed as part of the drive mechanism;

wherein the first key stop is selectively engaged with the second key stop as the worm gear rotates relative to the drive mechanism.

3. An electronic parking pawl actuator, comprising:

an electric motor;

a worm gear operable for being rotated by the electric motor;

a drive mechanism operable for being rotated by the worm gear, and the electric motor rotates the worm gear such that the drive mechanism is rotated to configure a gear selector linkage component such that a transmission operates in a desired gear;

a first key stop integrally formed as part of the worm gear;

a second key stop integrally formed as part of the worm gear;

a first outer flange integrally formed as part of the drive mechanism; and a second outer flange integrally formed as part of the drive mechanism;

wherein the combined circumferential length of the first key stop, the second key stop, the first outer flange, and the second outer flange is less than 360°, such that there is relative rotation between the worm gear and the drive mechanism when the first outer flange is not in contact with the first key stop and the second key stop, and the second outer flange is not in contact with the first key stop and the second key stop, and as the worm gear is rotated in the first direction and the first key stop is in contact with the second outer flange and the second key stop is in contact with the first outer flange, rotational force is transferred from the first key stop to the second outer flange, and rotational force is transferred from the second key stop to the first outer flange.

4. The electronic parking pawl actuator of claim 3, wherein as the worm gear is rotated in the second direction and the first key stop is in contact with the first outer flange and the second key stop is in contact with the second outer flange, rotational force is transferred from first key stop to the first outer flange, and rotational force is transferred from the second key stop to the second outer flange.

5. The electronic parking pawl actuator of claim 3, further comprising:

a first spring in contact with the first outer flange and the second key stop;

a second spring in contact with the second outer flange and the first key stop;

wherein the first spring and the second spring are compressed as the worm gear is rotated in the first direction and there is relative rotation between the worm gear and the drive mechanism as gear selector linkage component changes position, such that the amount of rotational force applied to the drive mechanism continues to increase as the first spring is compressed and the second spring is compressed, and the drive mechanism rotates and changes the position of the gear selector linkage component to configure the transmission for operating in the desired gear, and the compressive force in the first spring and the second spring is reduced once the gear selector linkage component is positioned such that the transmission is configured to operate in the desired gear.

6. The electronic parking pawl actuator of claim 5, the drive mechanism further comprising:

a first capturing groove integrally formed as part of the first outer flange, the first spring partially disposed in the first capturing groove;

a first end wall integrally formed as part of the first capturing groove, the first end of the first spring is in contact with the first end wall, and the second end of the first spring is in contact with the second key stop;

a second capturing groove integrally formed as part of the second outer flange, the second spring partially disposed in the second capturing groove; and a second end wall integrally formed as part of the second capturing groove, a first end of the second spring is in contact with the second end wall, and the second send of the second spring is in contact with the first key stop;

wherein as the worm gear is rotated in the first direction, the first end wall and the second key stop apply force to and compress the first spring, and the second end wall and the first key stop apply force to and compress the second spring.

7. The electronic parking pawl actuator of claim 6, the drive mechanism further comprising:

a notch integrally formed as part of the first key stop; and a notch integrally formed as part of the second key stop;

wherein the second end of the first spring is in contact with the notch formed as part of the second key stop, and the second end of the second spring is in contact with the notch formed as part of the first key stop.

8. An electronic parking pawl actuator, comprising:

an electric motor;

a worm gear operable for being rotated by the electric motor;

a drive mechanism operable for being rotated by the worm gear;

a first spring;

a second spring;

a first end wall integrally formed as part of the drive mechanism, a first end of the first spring in contact with the first end wall integrally formed as part of the drive mechanism;

a second end wall integrally formed as part of the drive mechanism, a second end of the second spring in contact with the second end wall integrally formed as part of the drive mechanism;

a first recess integrally formed as part of the drive mechanism, the first spring partially disposed in the first recess;

a second recess integrally formed as part of the drive mechanism, the second spring partially disposed in the second recess;

a first end wall integrally formed as part of the first recess, a second end of the first spring is in contact with the first end wall formed as part of the first recess; and a second end wall integrally formed as part of the second recess, and a first end of the second spring is in contact with the second end wall integrally formed as part of the second recess;

wherein compressive force in the first spring is increased as the worm gear is rotated in the first direction and there is relative rotation between the worm gear and the drive mechanism, and compressive force in the second spring is increased as the worm gear is rotated in the second direction and there is relative rotation between the worm gear and the drive mechanism, and as the gear selector linkage component changes position when the worm gear is rotated in the first direction, such that the amount of rotational force applied to the drive mechanism continues to increase as the first spring is compressed, and the drive mechanism rotates and changes the position of the gear selector linkage component to configure the transmission for operating in the desired gear, and the compressive force in the first spring reduced once the gear selector linkage component is positioned such that the transmission is configured to operate in the desired gear.

9. The electronic parking pawl actuator of claim 8, wherein as the gear selector linkage component changes position when the worm gear is rotated in the second direction, such that the amount of rotational force applied to the drive mechanism continues to increase as the second spring is compressed, and the drive mechanism rotates and changes the position of the gear selector linkage component to configure the transmission for operating in the desired gear, and the compressive force in the second spring is reduced once the gear selector linkage component is positioned such that the transmission is configured to operate in the desired gear.

10. The electronic parking pawl actuator of claim 8, further comprising:
   a circumferential flange integrally formed as part of the drive mechanism;
   a first capturing groove integrally formed as part of the circumferential flange, the first spring partially disposed in the first capturing groove; and
   a second capturing groove integrally formed as part of the circumferential flange, the second spring partially disposed in the second capturing groove; and
   wherein the first end wall is integrally formed as part of the first capturing groove, and the second end wall is integrally formed as part of the second capturing groove.

11. The electronic parking pawl actuator of claim 10, the drive mechanism further comprising:
   a first pin connected to the circumferential flange;
   a second pin connected to the circumferential flange;
   a first arc-shaped slot integrally formed as part of the worm gear, the first pin slidably disposed in the first arc-shaped slot; and
   a second arc-shaped slot integrally formed as part of the worm gear, the second pin slidably disposed in the second arc-shaped slot;
   wherein the electric motor rotates the worm gear such that the drive mechanism is rotated to configure a transmission to operate in a desired gear, and the first pin moves in the first slot and the second pin moves in the second slot when there is relative rotation between the worm gear and the drive mechanism.

12. The electronic parking pawl actuator of claim 8, the drive mechanism further comprising:
   a first outer flange;
   a second outer flange;
   a first capturing groove integrally formed as part of the first outer flange, the first spring partially disposed in the first capturing groove; and
   a second capturing groove integrally formed as part of the second outer flange, the second spring partially disposed in the second capturing groove; and
   wherein the first end wall is integrally formed as part of the first capturing groove, and the second end wall is integrally formed as part of the second capturing groove.

* * * * *